United States Patent

[11] 3,567,955

| [72] | Inventor | Hemesh Laxmidas Thanawala<br>Stretford, Manchester, England |
|---|---|---|
| [21] | Appl. No. | 583,828 |
| [22] | Filed | Oct. 3, 1966 |
| [45] | Patented | Mar. 2, 1971 |
| [73] | Assignee | Associated Electrical Industries Limited<br>London, England |
| [32] | Priority | Sept. 22, 1965 |
| [33] | | Great Britain |
| [31] | | 40416/65 |

[54] CIRCUITS FOR INTERCONNECTING ALTERNATING CURRENT NETWORKS
6 Claims, 4 Drawing Figs.

[52] U.S. Cl. .................................... 307/51
[51] Int. Cl. .................................... H02j 1/10
[50] Field of Search .......................... 307/51, 52, 53, 54, 58, 60; 323/74, 75, 76, 77, 78, 79; 317/256, 49, 61.5, 50, 53, 20

[56] References Cited
UNITED STATES PATENTS

| 3,461,308 | 8/1969 | Kalkner et al. ............... | 307/51 |
| 2,898,545 | 8/1959 | Bird............................. | 323/77 |
| 3,356,900 | 12/1967 | Kalkner....................... | 317/20 |

Primary Examiner—Robert K. Schaefer
Assistant Examiner—H.J. Hohauser
Attorney—Larson, Taylor and Hinds ABSTRACT: An AC circuit includes an inductance and capacitance combination which is practically resonant at a conventional power frequency and a shunt for the capacitance including a saturable reactor and a resistance. A means, which may, for example, comprise a nonlinear resistance included in the shunt connection, is included to provide a damping effect on circuit transients as well as to assist the recovery of the reactor.

CIRCUITS FOR INTERCONNECTING ALTERNATING CURRENT NETWORKS

This invention relates to circuits for interconnecting alternating current networks which comprise a capacitance connected in series with an inductance to produce resonance or near resonance at conventional power frequencies, when the said networks operate normally, a means being provided to eliminate the resonant conditions when the current flow between the networks tends to increase, due to a fault in one of the networks for instance, whereby to increase the impedance of the interconnection and limit the current flow therethrough.

It has already been suggested to cause a disturbance of the resonance condition, that is to detune the L/C combination, with the aid of a bypass circuit which becomes effective when the predetermined permissible current flow between the networks is exceeded, and to use to this end saturable reactors.

The invention aims at an improvement by introducing a means which serves a double purpose, namely, to produce a damping effect and ensure rapid decay of circuit transients, due for instance to a short circuit in one of the networks, and also to assist the recovery of the reactor, that is to restore a high degree of nonsaturation of the reactor within a short time after the decline of the excess current.

Accordingly the present invention resides in an alternating current circuit including an inductance and a capacitance combination which is practically series resonant at a conventional power frequency and at normal operation of the circuit nd means for shunting at least a portion of the said capacitance, said shunt means including a saturable reactor and a resistance, characterized by the provision of means for automatically reducing the effective actual ohmic value of the said resistance when the current in the said combination exceeds a predetermined limit value and causes saturation of the reactor and for increasing the effective actual ohmic value of said resistance thereafter while the reactor returns to the unsaturated state thereof.

To this end the shunt can include a nonlinear resistor, or two resistors, of which one is bypassed for the lower ohmic value operation.

Stepping in accordance with the current magnitude the ohmic values of the shunt can be provided by two or more resistors with suitably proportioned bypass circuits.

A saturable reactor, or a series resonant circuit can serve for bypassing a resistor in the shunt.

More details will become apparent and the invention will be better understood from the following description referring to the accompanying drawings in which.

In all FIGS. similar reference characters denote similar parts.

Figure 1:
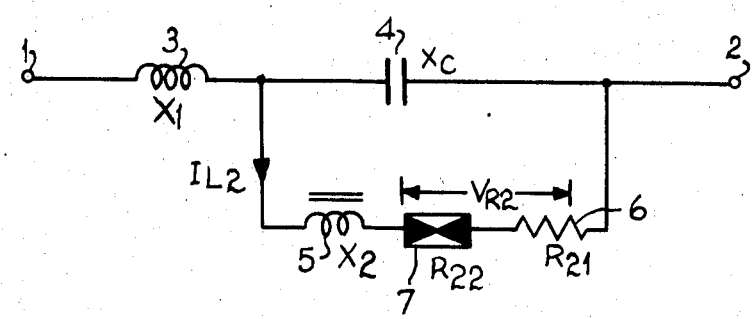
FIG. 1 shows a circuit arrangement embodying the invention, where the shunt includes an ohmic member which comprises a nonlinear resistor in series with a fixed resistor.
Figure 2:
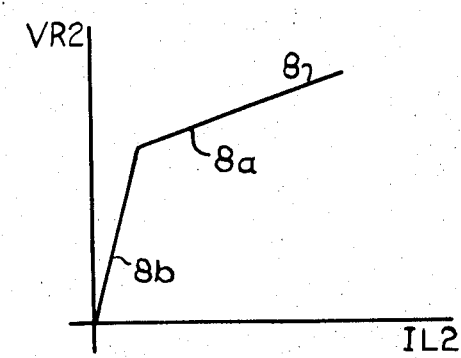
FIG. 2 shows a graph plotting the voltage drop across the ohmic member against current.

Referring to FIG. 1 alternating current networks (not shown) connectable to terminals 1,2 are interconnected by a choke 3, whose reactance is X1 and a capacitor 4 whose reactance is XC, connected in series with the choke to provide resonance or near-resonance conditions with a minimum impedance when the networks connected to the terminals 1,2 operate normally and at a conventional power frequency. When the normal operation in one of the networks is disturbed, such as by a fault, so that the current flow between the terminals tends to rise, this disturbs the series resonance and causes a high impedance, which opposes the said tendency. To this end, a saturable reactor 5 of inductive impedance X2 is connected in series with a fixed linear resistor 6, having a constant ohmic value R21, and a nonlinear resistor 7 whose ohmic value R22 is changeable. The current in the shunt is indicated by the arrow IL2. The operation is as follows:

When the current between terminals 1,2 rises suddenly, due for instance to a short circuit, the voltage across the capacitor 4 and the shunt, therefore also the current in the shunt rise, the reactor 5 saturates and the capacitor 4 is bypassed through the shunt whose impedance comprises in addition to the impedance X2 the ohmic values R21, and R22, producing a voltage drop VR2 across the resistors 6,7. In FIG. 2 the slope of graph 8 indicates the total ohmic value across the two resistors, since the tangent of the angle with the abscissa is the ratio voltage to current.

At higher current values when damping is required the resistance is less, and at a lower current for reactor recovery the resistance is greater, as will be seen from graph portions 8a, and 8b, which may represent the tangents to actual curves.

Figure 3:
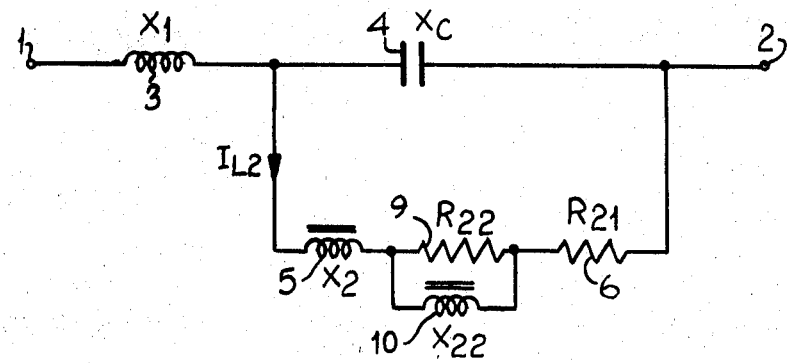
FIG. 3 shows an embodiment using two fixed resistors one of which is shunted by an auxiliary saturating reactor.

As shown in FIG. 3 the shunt can include a linear or fixed resistor 9 in lieu of the nonlinear resistor 7 of the FIG. 1 arrangement. The reduction in the ohmic effect is obtained by short-circuiting the resistor 9 with the aid of an auxiliary saturable reactor 10 of an impedance X22. The auxiliary reactor 10 operates in its unsaturated state when the current in the main saturating reactor 5 is below a predetermined value. Then the resistor 9 adds to the ohmic value of the resistor 6. When the current in reactor 5 exceeds the predetermined value the auxiliary reactor 10 saturates and shunts out the register 9 so that the ohmic value of the bypass is reduced, virtually to the value R21. The relationship of the various components can be readily proportioned to obtain the desired effects at predetermined values of the current.

Figure 4:
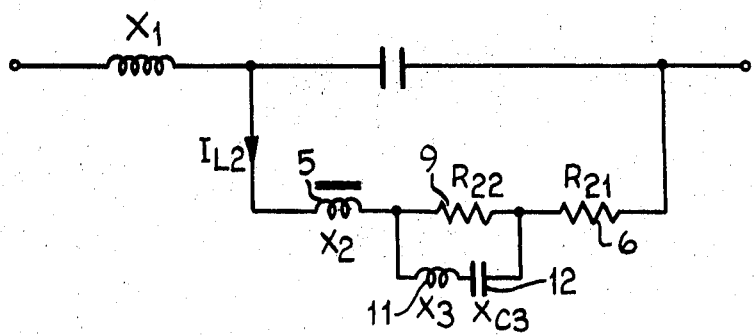
FIG. 4 illustrates another embodiment in which one of two linear series resistors is bypassed by a series resonant L/C combination.

In another embodiment illustrated by FIG. 4, the resistor 9 is bypassed by a series resonant L/C combination, comprising an auxiliary reactor 11 of a reactance X3 and an auxiliary capacitor 12 of a reactance XC3. This combination is tuned to be resonant or almost resonant at the normal frequency of the two power networks so that resistor 9 is effective substantially to harmonic currents only. At a low degree of saturation the reactor 5 has a high harmonic content so that only a small fundamental frequency component of the current IL2 is bypassed through the acceptor filter formed for this frequency by the reactor 11 and capacitor 12. Consequentially the total resistive impedance as effective to the harmonic components of the current IL2 is high as determined by both resistors 6 and 9. When due to heavier current flow between the networks the saturation of reactor 5 is higher, the fundamental component of current IL2 is higher, the bypass provided by the reactor 11 and capacitor 12 becomes more effective and the total effective ohmic resistance is lowered as the resistor 9 is virtually short-circuited at the fundamental frequency of the current wave. By suitable correlation of the various components a current dependent characteristic of the ohmic resistance effected by the two resistors 6,9 can be designed to achieve a suitable operational characteristic. At normal operation the reactor 5 is unsaturated, passes sinusoidal current, and the series resonant shunt 11, 12 effectively short-circuits the resistor 9 so that the power loss is reduced to a permissible value.

Modifications are possible without departing from the invention as defined by the appended claims. An auxiliary capacitor can be connected in series with the reactor 5 and the current responsive ohmic component in order to cancel out part of the reactance of the reactor 5 existing under incomplete saturation conditions, so that the main current path becomes less capacitive and a high voltage is less likely to develop across the main capacitor 4. The value of the capacitive reactance of such an auxiliary capacitor can be within the range 0.5 and 1.5 of the capacitive reactance XC of the main capacitor 4.

The two networks can be similar or dissimilar and can include power generating or consuming machinery or apparatus. For instance one network may supply power and the other may consume power, or both networks can form branches of an alternating current supply source. The nonlinear resistor can be made of parts and materials as used in conventional surge diverters. The shunt can comprise a plurality of resistors made or controlled to ensure stepping of the impedance change.

I claim:

1. An alternating current circuit including an inductance and a capacitance combination which is practically series resonant at a conventional power frequency and at normal operation of the circuit and means for shunting at least a portion of the said capacitance, said shunting means including a saturable reactor and a resistance, characterized in that the resistance is at least partly provided by means having a nonlinear resistance characteristic for producing a reduction in the ohmic value of the resistance when the current in the said combination exceeds a predetermined limit value and causes saturation of the reactor, and for producing an increase in the ohmic value of said resistance on subsequent reduction of the current below said limit value while the reactor returns to the unsaturated state thereof.

2. A circuit as claimed in claim 1 wherein said means having a nonlinear resistance characteristic comprise a nonlinear resistor, and wherein said means for shunting at least a portion of said capacitance comprises a linear resistor connected in series with said nonlinear resistor.

3. A circuit as claimed in claim 1 wherein the means having a nonlinear resistance characteristic comprises a linear resistor and an auxiliary saturable reactor connected across said linear resistor.

4. A circuit as claimed in claim 3 wherein the shunt means includes a second linear resistor connected in series with the parallel combination of said first linear resistor and said auxiliary saturable reactor.

5. A circuit as claimed in claim 1 wherein said means having a nonlinear characteristic comprises a linear resistor and a series inductive and capacitance combination connected across said linear resistor.

6. A circuit as claimed in claim 1 wherein said means having a nonlinear resistance characteristic includes a second linear resistor connected in series with the parallel combination of said first linear resistor and said series inductance-capacitance combination.